Aug. 14, 1945.  F. IBARRA  2,381,957
AIRPLANE BRAKE
Filed June 19, 1942  2 Sheets-Sheet 1

INVENTOR.
FRANK IBARRA
BY
ATTORNEYS

Aug. 14, 1945. F. IBARRA 2,381,957
AIRPLANE BRAKE
Filed June 19, 1942 2 Sheets-Sheet 2

INVENTOR.
FRANK IBARRA
BY Munn, Liddy, Slaccum & Kane
ATTORNEYS

Patented Aug. 14, 1945

2,381,957

UNITED STATES PATENT OFFICE 2,381,957

AIRPLANE BRAKE

Frank Ibarra, San Francisco, Calif.

Application June 19, 1942, Serial No. 447,725

7 Claims. (Cl. 244—113)

The present invention relates to improvements in an airplane brake, and it consists of the combinations, constructions, and arrangements hereinafter described and claimed.

An object of my invention is to provide an airplane brake which has air brake flaps connected to the upper and lower surfaces of each wing. In the usual air brake of which I am aware, the air brake flaps are aligned with the ailerons and extend from the ailerons to the fuselage. These air brake flaps when mounted on the wings have a tendency to lift the plane when they are swung downwardly into braking position and if care is not exercised the plane will be stalled to a point where it might get out of control.

The principal object of my invention is to provide air brake flaps which are mounted on the top and bottom of each wing surface, and actuating mechanism by means of which the flaps are gradually opened so as to apply a braking force which will increase in effect and slow up the movement of the plane while at the same time permitting the pilot to maintain complete control at all times. The air brake flaps are so mounted as to permit some of the air to escape during the initial opening movement of the flaps. This eliminates any sudden braking action being applied to the airplane. I found that better results are obtained when the flaps are provided with openings so that even when the flaps are fully opened some air will escape through these openings. The pilot can keep full control of the plane due to this particular construction. The flaps on the upper surfaces of the wings have fewer openings than those on the lower surfaces. Such an arrangement prevents the plane from having any tendency to nose over during the applying of the air brakes.

The device may be used on the forward wings or on the stabilizers disposed at the rear of the plane. It is possible to mount the air brake flaps on both the forward wing surfaces and on the stabilizers and to operate them so that they will open and close in unison. The device is simple in construction and folds into a streamlined compact form when not in use.

Other objects and advantages will appear in the following specification, and the novel features of the device will be particularly pointed out in the appended claims.

My invention is illustrated in the accompanying drawings forming a part of this application, in which.

While I have shown only the preferred form of my invention, it should be understood that various changes or modifications may be made within the scope of the appended claims without departing from the spirit of the invention.

In carrying out my invention I make use of an airplane which has a fuselage A, front wings B, stabilizers C, and a propeller D. The front wings have the usual ailerons B', while the stabilizers have the usual elevators C'. The airplane is also provided with a rudder E. These parts are all standard and form no part of my invention save insofar as they cooperate with my invention now to be described.

Figure 1:
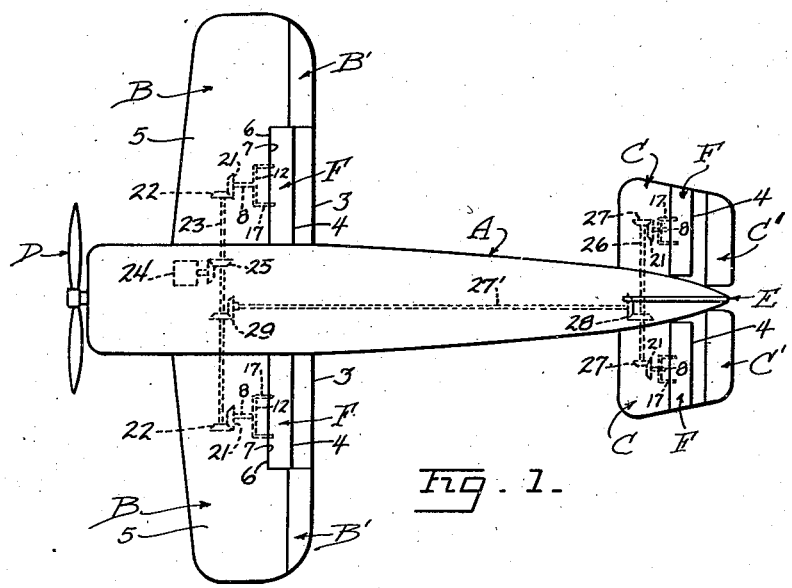
Figure 1 is a plan view of an airplane showing my device operatively applied to the wings and the stabilizers.
Figure 2:
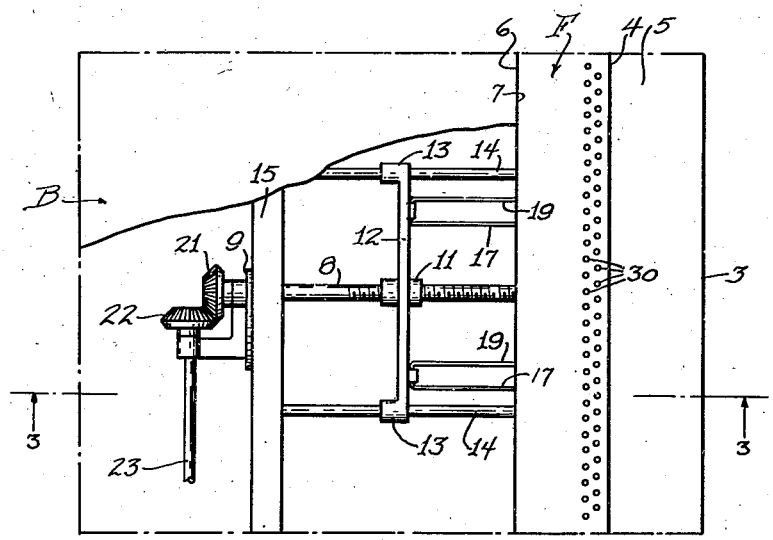
Figure 2 is a plan view of a portion of one of the wings showing the operating mechanism on a larger scale, a portion of the wings being broken away to show the mechanism in full lines.
Figure 3:
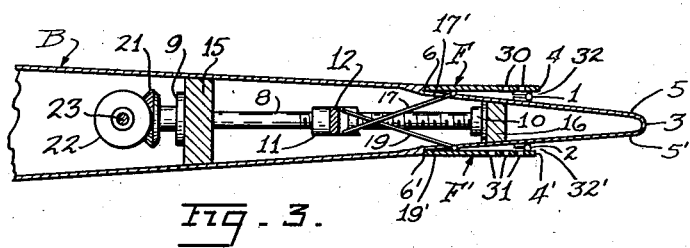
Figure 3 is a section along the line 3—3 of Figure 2.
Figure 4:
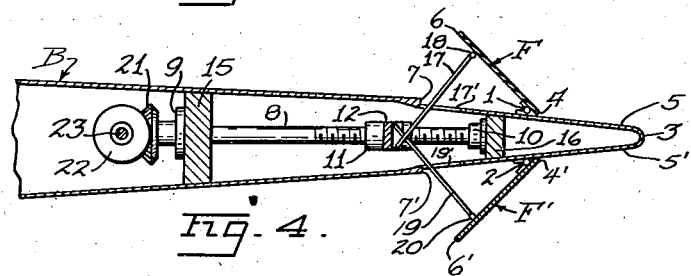
Figure 4 is a view similar to Figure 3 and shows the air brake flaps in full open position.

The air brake is mounted on the wings B and also on the stabilizer C. Since the air brake is the same whether it is mounted on the wings or on the stabilizers, a description of the one shown on the wing B will suffice. In Figures 2, 3 and 4 I show the construction of the air brake in detail. An air brake flap F is mounted on top of the wing B and is hinged to the wing at 1. A second flap F' is hinged at 2 to the bottom of the wing. The hinges 1 and 2 are arranged in vertical alignment. Figure 1 shows the air brake flap F as extending from the aileron B' to the fuselage A. The hinge 1 is placed in advance of the trailing edge 3 of the wing. It will be noted from Figure 3 that the hinge 1 spaces the rear edge 4 of the flap F above the upper surface 5 of the wing. The forward edge 6 of the flap is normally received behind a shoulder 7 formed on the upper wing surface 5, see Figure 4. The flap when in closed position presents a streamlined surface so that the air will flow along the upper surface 5 and over the top of the flap F without any tendency of opening the flap.

The same structure is used in the lower flap F'. Here the lower wing surface 5' has a shoulder 7' for receiving the front edge 6' of the lower flap F'. The rear edge 4' of the lower flap is spaced away from the lower surface 5' when the flap is in closed position. The flaps when in closed position will not impede the normal flight of the airplane.

I will now described the means for moving the flaps from closed to open position. In Figure 2 I show a screw shaft 8 that is journalled in bearings 9 and 10, see Figure 3. A sleeve 11 with internal threads is mounted on the screw shaft and carries a push bar 12. The free ends of the bar 12 have sleeves 13 that slide on guide rods 14, the rods parallelling the screw shaft 8. The ends of the rods are supported by structural members 15 and 16 that extend along the length of the wing. Links 17 are pivoted to the bar 12 and to the flap F at 18. Additional links 19 are pivoted to the bar 12 and to the lower flap F' at 20. The construction is such that rotation of the screw shaft 8 in a certain direction will move the sleeve 11 for causing the bar to move the links 17 and 19 to swing the flaps F and F' into open position. The flaps F and F' on both sides of the fuselage A are operatively connected together by bevelled gears 21 mounted on the screw shafts 8 and by bevelled gears 22 that are mounted on a connecting shaft 23. The shaft 23 may be manually rotated for actuating the flaps or reversible electric motor 24 may be operatively connected to the shaft by bevelled gears 25. A switch, not shown, may be closed by the pilot for operating the reversible motor in the desired direction for opening or closing the flaps.

It will also be seen from Figure 1 that the stabilizers C have air brake flaps operatively applied to their upper and lower surfaces. The flaps on the stabilizers are actuated in the same manner as the flaps already described. The bevelled gears 21 are connected to a cross shaft 26 by bevelled gears 27 and the cross shaft is connected to the forward cross shaft 23 by a longitudinally extending shaft 27' that has bevelled gear connections 28 with the shaft 26 and bevelled gear connections 29 with the shaft 23. The motor will therefore operate all of the flaps on the wings and stabilizers in unison.

From the foregoing description of the various parts of the device, the operation thereof may be readily understood.

The flaps F have openings 30 therein which are fewer in number than the openings 31 in the flaps F'. More air will pass through the openings in the flaps F' than in the flaps F and this will tend to keep the plane from having a tendency to "nose over" during the opening of the flaps. The openings 30 and 31 are not shown in Figure 4. When the pilot wishes to apply the brakes to the airplane he closes the circuit to the motor 24 which will start the flaps to swing into open position. The initial opening movement will provide slots 32 and 32' between the rear edges 4 and 4' and the adjacent wing surfaces 5 and 5' through which some of the air will flow. The braking force is gradually applied due to this initial escape of air. As the flaps continue to open, the slots 32 and 32' are gradually closed until in full open position as depicted in Figure 4 the slots 32 and 32' will be entirely closed. The air brakes are now fully applied and will bring the airplane to a quick stop. The braking force can be lessened at any time by reversing the rotation of the motor and causing the flaps to move toward closed position.

Figure 5:
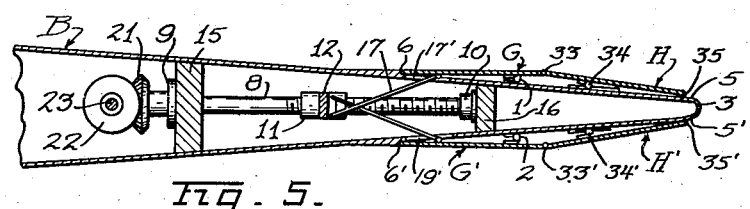
Figure 5 is a view through a modified form of the invention.
Figure 6:
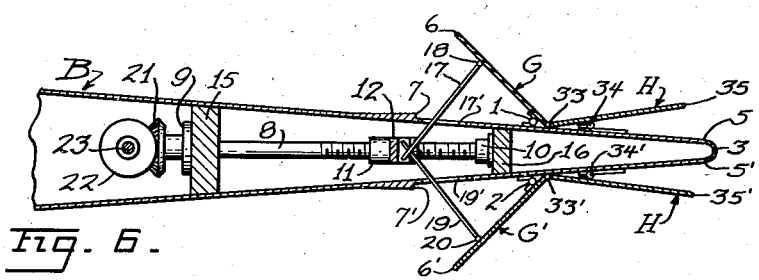
Figure 6 is a view similar to Figure 5 but showing the parts in open position.

In Figures 5 and 6 I show a modified form of air brake where the flaps G and G' are provided with streamlined rear flaps H and H'. The rear flaps H and H' are hinged at 33 and 33' to the rear edges of the flaps G and G'. The rear flaps are hinged to the wing B by sliding hinges 34 and 34'. The mechanism for opening the flaps G and G' is identical to that described in operating the flaps F and F'.

As the flaps G and G' are opened, the rear flaps H and H' will be swung in the manner shown in Figure 6. The hinges 34 and 34' will slide forwardly a slight distance during this movement. The operation of the flaps G and G' will be the same as the flaps F and F'. When the flaps G and G' are closed, the rear flaps H and H' will have their rear edges 35 and 35' contacting with the upper and lower surfaces 5 and 5' of the wing B. A streamlined effect for the wing is provided in this way when the flaps are closed. The flaps G and G' may be perforated in the same manner as the flaps F and F' although the perforations are not shown in Figures 4 and 5.

Figure 7:
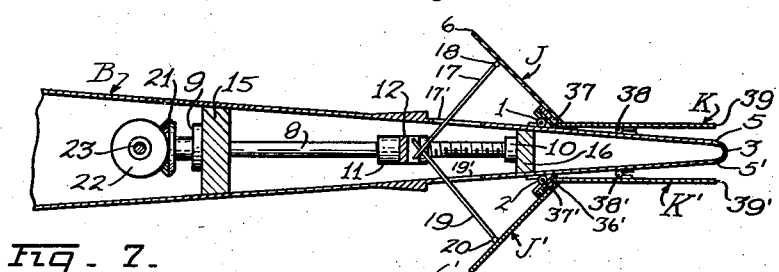
Figure 7 is a view of another modified form of the invention.
Figure 8:
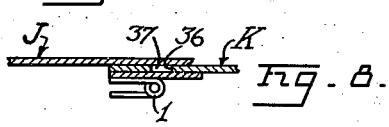
Figure 8 is a detail of a portion of the device shown in Figure 7.

Another modified form of the invention is illustrated in Figures 7 and 8. In this form the flaps J and J' are connected to the rear flaps K and K' by the front edges 36 and 36' of the rear flaps, see Figure 8, being received in slots 37 and 37' formed at the rear edges of the flaps J and J'. The hinges 38 and 38' connecting the rear flaps to the wing B are not of the sliding type as is true of the hinges 34 and 34'.

The operation of the form of the invention shown in Figures 7 and 8 is identical to that shown in Figures 5 and 6 except that the forward edges 36 and 36' of the rear flaps will slide in the slots 37 and 37' during the opening and closing movement of the front flaps J and J'. Figure 7 illustrates the flaps J and J' in full open position. When they are in closed position, the rear flaps K and K' will have their rear edges 39 and 39' contacting with the wing B.

It will be noted that the links 17 and 19 extend through slots 17' and 19' in the upper and lower wing surfaces. These slots are closed by the flaps when the flaps are in closed position. The flaps F and F' at the stabilizers C are provided with more openings in the flap F' than in the flap F. However, if desired, the openings may be of equal number in both flaps F and F'.

I claim:

1. The combination with an airfoil surface, of a brake flap hinged near its rear edge to the surface, the hinged axis being spaced from the surface whereby the front edge of the flap contacts with the air foil surface when the flap is in inoperative position and the rear edge is spaced away from the airfoil surface a slight distance to provide a slot, and means for swinging said flap into open position and for holding the flap at any desired degree of opening, the slot remaining open during the initial opening of the flap and permitting some of the air trapped by the flap to escape, thereby causing the flap to apply a braking force more gradually to the airfoil as the flap is gradually opened.

2. The combination with an airfoil surface, of a brake flap hinged near its rear edge to the surface, the hinged axis being spaced from the surface whereby the front edge of the flap contacts with the air foil surface when the flap is in inoperative position and the rear edge is spaced away from the airfoil surface a slight distance to provide a slot, and means for swinging said flap into open position and for holding the flap at any desired degree of opening, the slot remaining open during the initial opening of the flap and permitting some of the air trapped by the flap to escape, thereby causing the flap to apply a braking force more gradually to the airfoil as the flap is gradually opened, said flap having its rear edge swingable into contact with the airfoil surface when the flap is fully open, said flap having perforations therein for permitting the escape of some of the trapped air.

3. The combination with an airfoil having two surfaces of a brake flap hinged near its rear edge to each surface, the hinged axes being spaced from the surfaces so that the rear edges of the flaps will be spaced away from the surfaces a slight distance to provide slots when the flaps are in inoperative position, and means for swinging the flaps into open position simultaneously and for maintaining the flaps at the desired degree of opening, the slots remaining open during the initial opening of the flaps for permitting some of the trapped air to escape and thus gradually apply a braking force to the airfoil during the gradual opening of the flaps.

4. The combination with an airfoil having two surfaces, of a brake flap hinged near its rear edge to each surface, the hinged axes being spaced from the surfaces so that the rear edges of the flaps will be spaced away from the surfaces a slight distance to provide slots when the flaps are in inoperative position, and means for swinging the flaps into open position simultaneously and for maintaining the flaps at the desired degree of opening, the slots remaining open during the initial opening of the flaps for permitting some of the trapped air to escape and thus gradually apply a braking force to the airfoil, said flaps having their rear edges swingable into contact with the airfoil surfaces for closing the slots when the flaps are fully open, said flaps having perforations therein for permitting the escape of some of the trapped air.

5. The combination with an airplane having wings, of brake flaps hinged near their rear edges to the upper and lower surfaces of the wings, the hinge axes being spaced from the surfaces so that the rear edges will be spaced from the wing surfaces when the flaps are closed and form slots between the rear edges and the wing surfaces, and means for simultaneously swinging all of the brake flaps into open position so that the flaps will be inclined to the planes of the wing surfaces and cooperate therewith for receiving air and retarding the forward movement of the airplane, said slots remaining open during the initial opening of flaps for permitting a portion of the trapped air to escape and thus gradually apply the braking power to the airplane, said slots being progressively closed as the flaps are gradually opened.

6. In a device of the type described, an airfoil having upper and lower surfaces with shoulders for receiving the front edges of wing flaps, flaps hinged at their rear edges to the upper and lower airfoil surfaces and normally lying in closed position so as to overlie portions of the airfoil surfaces with their front edges received in back of the shoulders, and means disposed within the airfoil for opening and closing the flaps, each portion of the air foil normally covered by the flap having a slot therein, said means including links projecting through the slots for actuating the flaps.

7. In a device of the type described, an airfoil having upper and lower surfaces, flaps having their rear edges hinged to the upper and lower airfoil surfaces, each hinge axis being spaced from the adjacent surface whereby the rear edge of the flap is supported at a position away from the surface, rear flaps hinged to the rear edges of the first-mentioned flaps, hinges slidably connected to the upper and lower airfoil surfaces and to the rear flaps, means for opening and closing the first-named flaps, the rear edges of the first-named flaps being spaced from the airfoil surfaces when the flaps are closed and holding the rear flaps with their rear edges contacting with the airfoil surfaces to form streamlined coverings.

FRANK IBARRA.